United States Patent [19]
Kanesaka et al.

[11] Patent Number: 5,681,788
[45] Date of Patent: Oct. 28, 1997

[54] CATALYSTS FOR THE PURIFICATION OF EXHAUST GAS

[75] Inventors: Hiroyuki Kanesaka, Narita; Hiroshi Akama, Zushi; Maki Kamikubo, Yokosuka, all of Japan

[73] Assignee: Nissan Motor Co., Ltd., Kanagawa Pref., Japan

[21] Appl. No.: 630,570

[22] Filed: Apr. 10, 1996

[30] Foreign Application Priority Data

Apr. 11, 1995 [JP] Japan .................................. 7-085229

[51] Int. Cl.$^6$ .................................................. B01J 29/06
[52] U.S. Cl. .................................. 502/65; 502/64; 502/66; 502/71; 502/73; 502/74; 502/77; 423/213.5; 423/239.2
[58] Field of Search .................................. 502/64, 65, 66, 502/71, 73, 74, 77; 423/213.5, 239.2

[56] References Cited

U.S. PATENT DOCUMENTS 5,376,610  12/1994  Takahata et al. ......................... 502/66
5,427,989   6/1995  Kanesaka et al. ......................... 502/66

FOREIGN PATENT DOCUMENTS 1-127044   5/1989  Japan .

OTHER PUBLICATIONS

Translation of '044 reference.

*Primary Examiner*—Michael Lewis
*Assistant Examiner*—Thomas G. Dunn, Jr.
*Attorney, Agent, or Firm*—Lowe, Price, LeBlanc & Becker

[57] ABSTRACT

A catalyst for the purification of exhaust gas comprises a first coat layer of a palladium-carried activated alumina containing Ce, Zr and La formed on a honeycomb carrier, a second coat layer of an activated alumina containing Ce, Zr and La formed on the first coat layer, and a third coat layer of copper ion-exchanged zeolite powder formed on the second coat layer and efficiently purifies NOx, HC and CO in the exhaust gas under conditions from theoretical air-fuel ratio to excessive oxygen atmosphere.

3 Claims, No Drawings

CATALYSTS FOR THE PURIFICATION OF EXHAUST GAS

BACKGROUND OF THE INVENTION

1. Field of the Invention

This invention relates to catalysts for the purification of exhaust gas, and more particularly to a catalyst for purifying nitrogen oxide (NOx), hydrocarbons (BC) and carbon monoxide (CO) in an exhaust gas discharged from an internal combustion engine of an automobile or the like.

2. Description of Related Art

As the conventional catalyst for the purification of exhaust gas using zeolite, there is known a catalyst in which a catalyst layer containing a noble metal component is coated onto a carrier as an inner layer causing an oxidation reaction and a zeolite is coated thereon and subjected to an ion exchange with Cu as disclosed in JP-A-1-127044. Such a catalyst efficiently purifies the hydrocarbon, carbon monoxide and nitrogen oxide even when an oxygen concentration in the exhaust gas is a value exceeding a theoretical air-fuel ratio (i.e. excessive oxygen atmosphere).

In this catalyst, however, the performance after the aging is degraded as compared with catalysts having no oxidation catalyst layer as an inner layer and hence the satisfactory purification performance can not be obtained. Furthermore, the sufficient purification performance of nitrogen oxide is not obtained under operating conditions of the internal combustion engine repeatedly exposed to theoretical air-fuel ratio and the excessive oxygen atmosphere.

SUMMARY OF THE INVENTION

It is, therefore, an object of the invention to provide catalysts for the purification of exhaust gas using zeolite which improve the performances after the aging and can efficiently purify NOx, HC and Co under conditions of theoretical air-fuel ratio and excessive oxygen atmosphere.

According to the invention, there is the provision of a catalyst for the purification of exhaust gas comprising a first coat layer formed on a honeycomb carrier and consisting essentially of an activated alumina containing cerium, zirconium and lanthanum and carried with palladium, a second coat layer formed on the first coat layer and consisting essentially of an activated alumina containing cerium, zirconium and lanthanum, and a third coat layer formed on the second coat layer and consisting essentially of zeolite powder ion-exchanged with copper.

According to the invention, the aforementioned problem is particularly solved by arranging the catalyst according to the invention on an entrance side of an exhaust gas system and arranging a three-way catalyst on a delivery side of the exhaust gas system and incorporating these catalysts into the same container, whereby NOx, HC and CO can be purified under conditions of a theoretical air-fuel ratio and an excessive oxygen atmosphere.

DESCRIPTION OF THE PREFERRED EMBODIMENTS

The catalyst according to the invention is arranged on the entrance side of the exhaust gas system to purify nitrogen oxide under the excessive oxygen atmosphere, while the three-way catalyst is arranged on the delivery side of the exhaust gas system in the same container to purify nitrogen oxide, hydrocarbon and carbon monoxide under the theoretical air-fuel ratio.

In the catalyst according to the invention, the first coat layer formed on the honeycomb carrier and consisting essentially of the activated alumina containing cerium, zirconium and lanthanum and carried with palladium purifies nitrogen oxide, hydrocarbon and carbon monoxide under the theoretical air-fuel ratio and also causes oxidation catalytic reaction under the excessive oxygen atmosphere to purify hydrocarbon and carbon monoxide. In this case, the temperature in the whole of the first to third coat layers is raised by reaction heat produced in the oxidation catalytic reaction to promote the activation of the catalyst, whereby the purification of nitrogen oxide through the third coat layer consisting essentially of zeolite powder is generated from a low temperature region under the excessive oxygen atmosphere.

The second coat layer formed on the first coat layer and consisting essentially of the activated alumina containing cerium, zirconium and lanthanum acts to mitigate the oxidation reaction heat produced in the first coat layer when this heat is transferred to the third coat layer. Particularly, as the temperature of the exhaust gas discharged from the engine becomes higher, the second coat layer serves to control the temperature rising of the third coat layer to prevent the degradation of the third coat layer. Furthermore, the second coat layer acts to prevent the movement of Cu included in the third coat layer as an active catalyst component from an active site of zeolite to Pd position of the first coat layer to control the degradation of the performance.

In the first and second coat layers, cerium, zirconium and lanthanum are included in the activated alumina and act to adsorb nitrogen oxide under an oxidizing atmosphere, so that these layers have a high purification ability of nitrogen oxide under the engine operating condition of existing both the theoretical air-fuel ratio and the excessive oxygen atmosphere. Furthermore, they have an ability of storing oxygen in the change of oxygen concentration, which is called as an oxygen storage ability, so that they act to adjust the oxygen concentration when the operating condition is turned over from the theoretical air-fuel ratio to the excessive oxygen atmosphere or vice versa and hence the purification performance of nitrogen oxide through the third coat layer is more improved under the excessive oxygen atmosphere.

The third coat layer consisting essentially of zeolite powder ion-exchanged with Cu has a high purification performance of nitrogen oxide under the excessive oxygen atmosphere.

The zeolite powder ion-exchanged with copper is produced, for example, by immersing zeolite powder in an aqueous solution of copper nitrate for several ten hours, filtering the aqueous solution, washing the zeolite powder and then firing it at 400°–600° C. for several hours. In this case, the ion exchanging percentage can be improved by adding ammonia water dropwise to the aqueous solution of copper nitrate to properly adjust pH of the aqueous solution.

The zeolite used preferably has MFI structure among pentasyl type crystalline aliminosilicates. The MFI structure means the same structure as ZSM-5 or a structure similar to ZSM-5 and includes, for example, ZSM-8, ZSM-11, zeta 1, zeta 3, Nu-4, Nu-5, TZ-1, TPZ-1 and the like in addition to ZSM-5.

The three-way catalyst arranged behind the catalyst according to the invention in the same container acts to purify nitrogen oxide, hydrocarbon and carbon monoxide under the theoretical air-fuel ratio, which can not sufficiently purified in the first coat layer of the catalyst according to the invention, and serves to warm the container as a whole by reaction heat produced through the catalytic reaction from a low temperature region under the theoretical air-fuel ratio and excessive oxygen atmosphere to activate the catalyst according to the invention arranged before the three-way catalyst from a lower temperature region. As the three-way catalyst, use may be made of noble metal catalysts usually used in the purification of the exhaust gas discharged from the internal combustion engine and obtained by coating a honeycomb carrier with noble metal-carried alumina such as Pt/Rh catalyst, Pd/Rh catalyst, Pd catalyst and the like.

The following examples are given in illustration of the invention and are not intended as limitations thereof.

EXAMPLE 1

An aqueous solution of palladium nitrate is added to 1000 g of activated alumina powder containing 3 mol % of cerium, 3 mol % of zirconium and 2 mol % of lanthanum so as to render a palladium content into 2.0% by weight, well stirred, dried in an oven at 150° C. for 3 hours and then fired in air at 400° C. for 2 hours. Into a ball mill pot are charged 1500 g of the thus obtained palladium-carried activated alumina, 800 g of activated alumina powder containing 3 mol % of cerium, 3 mol % of zirconium and 2 mol % of lanthanum, 460 g of 10 wt % nitric acid and 1840 g of water, which are pulverized for 8 hours to obtain a slurry. The thus obtained slurry is applied onto a monolithic honeycomb carrier (1.3 L, 400 cells), which is dried and fired in air at 400° C. for 2 hours. In this case, the amount of active component applied is set to be 52 g per the carrier after the firing.

Next, 2000 g of activated alumina powder consisting essentially of γ-alumina and containing 3 mol % of cerium, 3 mol % of zirconium and 2 mol % of lanthanum, 400 g of 10 wt % nitric acid and 1600 g of water are charged into a ball mill pot and pulverized therein for 8 hours to obtain a slurry. This slurry is applied to the carrier in such a manner that the amount of active component applied is 52 g per the carrier after the firing, dried and fired in air at 400° C. for 2 hours.

Further, 5.2 kg of a solution of 0.2 mol/L of copper nitrate or copper acetate is mixed with 2 kg of zeolite powder, which is stirred and filtered. After this procedure is repeated three times, the mixture is dried and fired to obtain zeolite powder ion-exchanged with Cu. Into a porcelain ball mill are charged 1890 g of the zeolite powder ion-exchanged with Cu, 1150 g of silica sol (solid content: 20%) and 1100 g of water, which are pulverized to obtain a slurry. This slurry is applied to the carrier in such a manner that the amount of active component applied is 325 g per the carrier after the firing, dried and fired in air at 400° C. for 2 hours to obtain a catalyst L1.

Separately, an aqueous solution of palladium nitrate is added to 1000 g of activated alumina powder consisting essentially of γ-alumina and containing 3 mol % of cerium, 3 mol % of zirconium and 2 mol % of lanthanum so as to render a palladium content into 2.0% by weight, which are stirred and dried in an oven at 150° C. for 3 hours and then fired in air at 400° C. for 2 hours to prepare an activated alumina carried with palladium. Further, an aqueous solution of palladium nitrate is added to 1000 g of cerium oxide powder so as to render a palladium content into 2.0% by weight, which are stirred and dried in an oven at 150° C. for 3 hours and then fired in air at 400° C. for 2 hours. Into a ball mill pot are charged 980 g of the activated alumina carried with palladium, 433 g of cerium oxide carried with palladium, 237 g of cerium oxide, 320 g of activated alumina consisting essentially of γ-alumina and containing 3 mol % of cerium, 3 mol % of zirconium and 2 mol % of lanthanum and 1750 g of boehmite sol acidified with nitric acid (sol obtained by adding 10 wt % $HNO_3$ to a suspension of 10 wt % boehmite alumina) and pulverized for 8 hours to obtain a slurry. The thus obtained slurry is applied onto a monolithic carrier (0.7 L, 400 cells), dried and fired in air at 400° C. for 2 hours. In this case, the amount of active component applied is 140 g per the carrier. Further, barium acetate is applied thereonto so as to render a barium content into 10 g as BaO per the carrier, dried and fired at 400° C. to prepare a three-way catalyst A.

A catalyst No. 1 is provided by arranging the catalyst L1 on an entrance side of an exhaust gas system and the three-way catalyst A on a delivery side thereof and incorporating them in the same container.

EXAMPLE 2

A catalyst L2 is prepared in the same manner as in Example 1 except that the amounts of cerium, zirconium and lanthanum included in the activated alumina are 2 mol % of cerium, 1 mol % of zirconium and 3 mol % of lanthanum. A catalyst No. 2 is provided by incorporating the catalyst L2 and the three-way catalyst A in the same container in the same manner as in Example 1.

EXAMPLE 3

A catalyst L3 is prepared in the same manner as in Example 1 except that the amounts of cerium, zirconium and lanthanum included in the activated alumina are 4 mol % of cerium, 4 mol % of zirconium and 1 mol % of lanthanum. A catalyst No. 3 is provided by incorporating the catalyst L3 and the three-way catalyst A in the same container in the same manner as in Example 1.

EXAMPLE 4

A catalyst L4 is prepared in the same manner as in Example 1 except that the catalyst volume is 1.0 L, while a three-way catalyst B is prepared in the same manner as in Example 1 except that the catalyst volume is 1.0 L. A catalyst No. 4 is provided by incorporating the catalyst L4 and the three-way catalyst B in the same container in the same manner as in Example 1.

EXAMPLE 5

A catalyst L5 is prepared in the same manner as in Example 1 except that the concentration of palladium carried is 1.0% by weight and the amounts of active components applied in the first to third coat layers are 72 g, 52 g and 300 g per the carrier as follows.

An aqueous solution of palladium nitrate is added to 1000 g of activated alumina powder containing 3 mol % of cerium, 3 mol % of zirconium and 2 mol % of lanthanum so as to render a palladium content into 1.0% by weight, well stirred, dried in an oven at 150° C. for 3 hours and then fired in air at 400° C. for 2 hours. Into a ball mill pot are charged 2140 g of the activated alumina carried with palladium, 160 g of activated alumina powder containing 3 mol % of cerium, 3 mol % of zirconium and 2 mol % of lanthanum, 460 g of 10 wt % nitric acid and 1840 g of water, which are pulverized for 8 hours to obtain a slurry. The thus obtained slurry is applied onto a monolithic honeycomb carrier (1.3 L, 400 cells), which is dried and fired in air at 400° C. for 2 hours. In this case, the amount of active component applied is set to be 72 g per the carrier after the firing.

Next, 2000 g of activated alumina powder consisting essentially of γ-alumina and containing 3 mol % of cerium, 3 mol % of zirconium and 2 mol % of lanthanum, 400 g of 10 wt % nitric acid and 1600 g of water are charged into a ball mill pot and pulverized therein for 8 hours to obtain a slurry. This slurry is applied to the carrier in such a manner that the amount of active component applied is 52 g per the carrier after the firing, dried and fired in air at 400° C. for 2 hours.

Further, the same zeolite powder ion-exchanged with Cu as in Example 1 is applied in such a manner that the amount of active component applied is 300 g per the carrier after the firing, whereby the catalyst L5 is obtained.

A catalyst No. 5 is provided by incorporating the catalyst L5 and the three-way catalyst A in the same container in the same manner as in Example 1.

EXAMPLE 6

A catalyst L6 is prepared in the same manner as in Example 1 except that the concentration of palladium carried is 3.0% by weight as follows.

An aqueous solution of palladium nitrate is added to 1000 g of activated alumina powder containing 3 mol % of cerium, 3 mol % of zirconium and 2 mol % of lanthanum so as to render a palladium content into 3.0% by weight, well stirred, dried in an oven at 150° C. for 3 hours and then fired in air at 400° C. for 2 hours. Into a ball mill pot are charged 10000 g of the thus obtained palladium-carried activated alumina, 1300 g of activated alumina powder containing 3 mol % of cerium, 3 mol % of zirconium and 2 mol % of lanthanum, 460 g of 10 wt % nitric acid and 1840 g of water, which are pulverized for 8 hours to obtain a slurry. The thus obtained slurry is applied onto a monolithic honeycomb carrier (1.3 L, 400 cells), which is dried and fired in air at 400° C. for 2 hours. In this case, the amount of active component applied is set to be 52 g per the carrier after the firing.

Next, 2000 g of activated alumina powder consisting essentially of γ-alumina and containing 3 mol % of cerium, 3 mol % of zirconium and 2 mol % of lanthanum, 400 g of 10 wt % nitric acid and 1600 g of water are charged into a ball mill pot and pulverized therein for 8 hours to obtain a slurry. This slurry is applied to the carrier in such a manner that the amount of active component applied is 52 g per the carrier after the firing, dried and fired in air at 400° C. for 2 hours.

Further, the same zeolite powder ion-exchanged with Cu as in Example 1 is applied in such a manner that the amount of active component applied is 325 g per the carrier after the firing, whereby the catalyst L6 is obtained.

A catalyst No. 6 is provided by incorporating the catalyst L6 and the three-way catalyst A in the same container in the same manner as in Example 1.

EXAMPLE 7

A catalyst L7 is prepared in the same manner as in Example 1 except that the amounts of active components applied in the first to third coat layers are 104 g, 52 g and 273 g per the carrier, respectively. A catalyst No. 7 is provided by incorporating the catalyst L7 and the three-way catalyst A in the same container in the same manner as in Example 1.

EXAMPLE 8

A catalyst L8 is prepared in the same manner as in Example 1 except that the amounts of active components applied in the first to third coat layers are 52 g, 104 g and 273 g per the carrier, respectively. A catalyst No. 8 is provided by incorporating the catalyst L8 and the three-way catalyst A in the same container in the same manner as in Example 1.

EXAMPLE 9

A catalyst L9 is prepared in the same manner as in Example 1 except that the amounts of active components applied in the first to third coat layers are 104 g, 104 g and 221 g per the carrier, respectively. A catalyst No. 9 is provided by incorporating the catalyst L9 and the three-way catalyst A in the same container in the same manner as in Example 1.

EXAMPLE 10

A three-way catalyst C is prepared in the same manner as in Example 1 except that platinum and rhodium are used instead of palladium as a noble metal as follows. A catalyst No. 10 is provided by incorporating the catalyst L1 and the three-way atalyst 1C in the same container in the same manner as in Example 1.

A solution of dinitrodiammineplatinum is added to 1000 g of activated alumina powder consisting essentially of γ-alumina and containing 3% by weight of cerium so as to render a platinum content into 2.0% by weight, which is stirred, dried in an oven at 150° C. for 3 hours and fired in air at 400° C. for 2 hours to prepare an activated alumina carried with platinum. Into a ball mill pot are charged 1400 g of the activated alumina carried with platinum, 936 g of cerium oxide, 320 g of activated alumina consisting essentially of γ-alumina and containing 3% by weight of cerium and 2221 g of boehmite sol acidified with nitric acid (sol obtained by adding 10 wt % $HNO_3$ to a suspension of 10 wt % boehmite alumina) and pulverized for 8 hours to obtain a slurry. The thus obtained slurry is applied onto a monolithic carrier (0.7 L, 400 cells), dried and fired in air at 400° C. for 2 hours. In this case, the amount of active component applied is 110 g per the carrier. Next, a solution of rhodium nitrate is added to 1000 g of activated alumina powder consisting essentially of γ-alumina and containing 3% by weight of zirconium so as to render a rhodium content into 1.0% by weight, which is stirred, dried and fired in the same manner as described above to prepare an activated alumina carried with rhodium. Into a ball mill pot are charged 500 g of the activated alumina carried with rhodium, 265 g of activated alumina consisting essentially of γ-alumina and containing 3% by weight of zirconium and 637 g of boehmite sol acidified with nitric acid (sol obtained by adding 10 wt % $HNO_3$ to a suspension of 10 wt % boehmite alumina) and pulverized for 8 hours to obtain a slurry. The thus obtained slurry is further applied onto the carrier in such a manner that the amount of active component applied is 28 g per the carrier, dried and fired in air at 400° C. for 2 hours to prepare the three-way catalyst C.

EXAMPLE 11

A catalyst No. 11 is provided by using only a catalyst prepared in the same manner as in Example 1 except that the amount of Pd carried is 3.0% by weight and the amounts of active components in the first and third coat layers are 130 g and 260 g per the carrier, respectively, as mentioned below.

An aqueous solution of palladium nitrate is added to 1000 g of activated alumina powder containing 3 mol % of cerium, 3 mol % of zirconium and 2 mol % of lanthanum so as to render a palladium content into 3.0% by weight, well stirred, dried in an oven at 150° C. for 3 hours and then fired in air at 400° C. for 2 hours. Into a ball mill pot are charged 1500 g of the activated alumina carried with palladium, 800 g of activated alumina powder containing 3 mol % of cerium, 3 mol % of zirconium and 2 mol % of lanthanum, 460 g of 10 wt % nitric acid and 1840 g of water, which are pulverized for 8 hours to obtain a slurry. The thus obtained slurry is applied onto a monolithic honeycomb carrier (1.3 L, 400 cells), which is dried and fired in air at 400° C. for 2 hours. In this case, the amount of active component applied is set to be 130 g per the carrier aster the firing.

Furthermore, alumina containing cerium, zirconium and lanthanum is applied so as to render the amount of active component applied into 52 g per the carrier and then the zeolite powder ion-exchanged with Cu is applied so as to render the amount of active component applied into 260 g per the carrier, which is fired at 400° C. for 2 hours likewise the catalyst L1 of Example 1.

COMPARATIVE EXAMPLE 1

An aqueous solution of palladium nitrate is added to 100 g of activated alumina powder containing 3 mol % of cerium and 3 mol % of lanthanum so as to render a palladium content into 2.0% by weight, well stirred, dried in an oven at 150° C. for 3 hours and then fired in air at 400° C. for 2 hours. Into a ball mill pot are charged 1500 g of the activated alumina carried with palladium, 800 g of activated alumina powder containing 3 mol % of cerium and 3 mol % of lanthanum, 460 g of 10 wt % nitric acid and 1840 g of water, which are pulverized for 8 hours to obtain a slurry. The thus obtained slurry is applied onto a monolithic honeycomb carrier (1.3 L, 400 cells), which is dried and fired in air at 400° C. for 2 hours. In this case, the amount of active component applied is set to be 52 g per the carrier after the firing.

Next, 2000 g of activated alumina powder consisting essentially of γ-alumina and containing 3 mol % of cerium and 2 mol % of lanthanum, 400 g of 10 wt % nitric acid and 1600 g of water are charged into a ball mill pot and pulverized therein for 8 hours to obtain a slurry. This slurry is applied to the carrier in such a manner that the amount of active component applied is 52 g per the carrier aster the firing, dried and fired in air at 400° C. for 2 hours.

Further, the same zeolite powder ion-exchanged with Cu as in Example 1 is applied in such a manner that the amount of active component applied is 325 g per the carrier after the firing, whereby the catalyst R1 is obtained as Comparative Example 1.

COMPARATIVE EXAMPLE 2

An aqueous solution of palladium nitrate is added to 1000 g of activated alumina powder consisting essentially of γ-alumina and containing 3 mol % of cerium, 3 mol % of zirconium and 2 mol % of lanthanum so as to render a palladium content into 2.0% by weight, which are stirred and dried in an oven at 150° C. for 3 hours and then fired in air at 400° C. for 2 hours to prepare an activated alumina carried with palladium. Further, an aqueous solution of palladium nitrate is added to 1000 g of cerium oxide powder so as to render a palladium content into 2.0% by weight, which are stirred and fired in an oven at 150° C. for 3 hours. Into a ball mill pot are charged 980 g of the activated alumina carried with palladium, 433 g of cerium oxide carried with palladium, 237 g of cerium oxide, 320 g of activated alumina consisting essentially of γ-alumina and containing 3 mol % of cerium and 2 mol % of lanthanum and 1750 g of boehmite sol acidified with nitric acid (sol obtained by adding 10 wt % $HNO_3$ to a suspension of 10 wt % boehmite alumina) and pulverized for 8 hours to obtain a slurry. The thus obtained slurry is applied onto a monolithic carrier (0.7 L, 400 cells), dried and fired in air at 400° C. for 2 hours. In this case, the amount of active component applied is 140 g per the carrier. In this way, a three-way catalyst R2 is prepared as Comparative Example 2.

COMPARATIVE EXAMPLE 3

A catalyst R3 is prepared in the same manner as in Example 1 except that only the zeolite powder ion-exchanged with Cu is applied onto the monolithic carrier. A catalyst R3A is provided by incorporating the catalyst R3 and the three-way catalyst A in the same container in the same manner as in Example 1.

TEST EXAMPLE

The specifications of the catalysts in Examples 1–11 and Comparative Examples 1–3 are shown in Table 1. The test for evaluation of purification performance after the aging is made with respect to each of these catalysts under the following conditions to obtain results as shown in Table 2.

Aging conditions

Displacement of engine: 2000 cc

Aging temperature: 550° C.

Aging time: 50 hours

Emission gases on entrance side in aging:

| | |
|---|---|
| CO | 0.4–0.6% |
| $O_2$ | 0.5 ± 0.1% |
| NO | 1500 ppm |
| HC | 1000 ppm |
| $CO_2$ | 14.9 ± 0.1% |

Evaluation conditions

Displacement of engine: 2000 cc

Air-fuel ratio (A/F) at entrance side of catalyst: 14.7 or 20.0

Space velocity: about 40,000 $h^{-1}$

TABLE 1

| | Zeolite catalyst | | | | Three-way catalyst | |
|---|---|---|---|---|---|---|
| | Structure of coat layers | | | | Catalyst | |
| | First layer | Second layer | Third layer | Volume | specification | Volume |
| Catalyst No. 1 | Pd 2%/Ce 3%-Zr 3%-La 2%-alumina 52 g/carrier | Ce 3%-Zr 3%-La 2%-alumina 52 g/carrier | Cu-zeolite 325 g/carrier | 1.3 L | Pd catalyst, Ce 3%-Zr 3% La 2%-alumina | 0.7 L Example 1 |
| Catalyst No. 2 | Pd 2%/Ce 2%-Zr 1%-La 3%-alumina 52 g/carrier | Ce 2%-Zr 1%-La 3%-alumina 52 g/carrier | Cu-zeolite 325 g/carrier | 1.3 L | Pd catalyst, Ce 3%-Zr 3% La 2%-alumina | 0.7 L Example 2 |
| Catalyst No. 3 | Pd 2%/Ce 4%-Zr 4%-La 1%-alumina 52 g/carrier | Ce 4%-Zr 4%-La 1%-alumina 52 g/carrier | Cu-zeolite 325 g/carrier | 1.3 L | Pd catalyst, Ce 3%-Zr 3% La 2%-alumina | 0.7 L Example 3 |
| Catalyst No. 4 | Pd 2%/Ce 3%-Zr 3%- | Ce 3%-Zr 3%-La 2%- | Cu-zeolite | 1.3 L | Pd catalyst, | 0.7 L Example 4 |

TABLE 1-continued

| | Zeolite catalyst | | | | Three-way catalyst | | |
|---|---|---|---|---|---|---|---|
| | Structure of coat layers | | | | Catalyst | | |
| | First layer | Second layer | Third layer | Volume | specification | Volume | |
| | La 2%-alumina 40 g/carrier | alumina 40 g/carrier | 325 g/carrier | | Ce 3%-Zr 3% La 2%-alumina | | |
| Catalyst No. 5 | Pd 1%/Ce 3%-Zr 3%-La 2%-alumina 52 g/carrier | Ce 3%-Zr 3%-La 2%-alumina 52 g/carrier | Cu-zeolite 325 g/carrier | 1.3 L | Pd catalyst, Ce 3%-Zr 3% La 2%-alumina | 0.7 L | Example 5 |
| Catalyst No. 6 | Pd 3%/Ce 3%-Zr 3%-La 2%-alumina 52 g/carrier | Ce 3%-Zr 3%-La 2%-alumina 52 g/carrier | Cu-zeolite 325 g/carrier | 1.3 L | Pd catalyst, Ce 3%-Zr 3% La 2%-alumina | 0.7 L | Example 6 |
| Catalyst No. 7 | Pd 2%/Ce 3%-Zr 3%-La 2%-alumina 104 g/carrier | Ce 3%-Zr 3%-La 2%-alumina 52 g/carrier | Cu-zeolite 273 g/carrier | 1.3 L | Pd catalyst, Ce 3%-Zr 3% La 2%-alumina | 0.7 L | Example 7 |
| Catalyst No. 8 | Pd 2%/Ce 3%-Zr 3%-La 2%-alumina 52 g/carrier | Ce 3%-Zr 3%-La 2%-alumina 104 g/carrier | Cu-zeolite 273 g/carrier | 1.3 L | Pd catalyst, Ce 3%-Zr 3% La 2%-alumina | 0.7 L | Example 8 |
| Catalyst No. 9 | Pd 2%/Ce 3%-Zr 3%-La 2%-alumina 104 g/carrier | Ce 3%-Zr 3%-La 2%-alumina 104 g/carrier | Cu-zeolite 221 g/carrier | 1.3 L | Pd catalyst, Ce 3%-Zr 3% La 2%-alumina | 0.7 L | Example 9 |
| Catalyst No. 10 | Pd 2%/Ce 3%-Zr 3%-La 2%-alumina 52 g/carrier | Ce 3%-Zr 3%-La 2%-alumina 52 g/carrier | Cu-zeolite 325 g/carrier | 1.3 L | Pt/Rh catalyst | 0.7 L | Example 10 |
| Catalyst No. 11 | Pd 2%/Ce 3%-Zr 3%-La 2%-alumina 130 g/carrier | Ce 3%-Zr 3%-La 2%-alumina 52 g/carrier | Cu-zeolite 260 g/carrier | 1.3 L | — | — | Example 11 |
| Catalyst R1 | Pd 2%/Ce 3%-La 2%-alumina 52 g/carrier | Ce 3%-La 2%-alumina 52 g/carrier | Cu-zeolite 325 g/carrier | 1.3 L | — | — | Comparative Example 1 |
| Catalyst R2 | — | — | — | — | Pd calalyst Ce 3%-La 2%-alumina | 0.7 L | Comparative Example 2 |
| Catalyst R3A | — | — | Cu-zeolite 325 g/carrier | 1.3 L | Pd catalyst Ce 3%-La 2%-alumina | 0.7 L | Comparative Example 3 |

In Table 1, % of Pd is % by weight, while % of each of Ce, Zr and La is mol %. For example, Pd2%/Ce3%-Zr3%-La3% in the first layer of the catalyst No. 1 means Pd 2% by weight/Ce 3 mol %-Ze 3 mol %-La 2 mol %.

TABLE 2

| | Evaluation results at A/F = 14.7 Purification ratio at 300° C. (%) | | | Evaluation results at A/F = 20.0 Purification ratio at 350° C. (%) | | | |
|---|---|---|---|---|---|---|---|
| | HC | CO | NOx | HC | CO | NOx | |
| Catalyst No. 1 | 92 | 93 | 94 | 97 | 99 | 65 | Example 1 |
| Catalyst No. 2 | 91 | 91 | 92 | 97 | 98 | 63 | Example 2 |
| Catalyst No. 3 | 95 | 96 | 91 | 98 | 97 | 63 | Example 3 |
| Catalyst No. 4 | 94 | 94 | 96 | 97 | 97 | 56 | Example 4 |
| Catalyst No. 5 | 89 | 90 | 91 | 98 | 98 | 65 | Example 5 |
| Catalyst No. 6 | 96 | 94 | 96 | 98 | 99 | 64 | Example 6 |
| Catalyst No. 7 | 98 | 99 | 97 | 97 | 98 | 60 | Example 7 |
| Catalyst No. 8 | 92 | 90 | 90 | 98 | 99 | 59 | Example 8 |
| Catalyst No. 9 | 97 | 97 | 96 | 99 | 97 | 54 | Example 9 |
| Catalyst No. 10 | 91 | 92 | 92 | 98 | 99 | 64 | Example 10 |
| Catalyst No. 11 | 94 | 92 | 90 | 53 | 68 | 50 | Example 11 |
| Catalyst R1 | 42 | 35 | 38 | 41 | 50 | 44 | Comparative Example 1 |
| Catalyst R2 | 84 | 88 | 87 | 96 | 94 | 12 | Comparative Example 2 |
| Catalyst R3A | 91 | 86 | 87 | 99 | 94 | 42 | Comparative Example 3 |

As mentioned above, according to the invention, the catalyst for purifying nitrogen oxide, hydrocarbon and carbon monoxide in the exhaust gas under theoretical air-fuel ratio and excessive oxygen atmosphere is provided by forming a first coat layer of activated alumina containing cerium, zirconium and lanthanum and carried with palladium on a honeycomb carrier, forming a second coat layer of activated alumina containing cerium, zirconium and lanthanum on the first coat layer and then forming a third coat layer of zeolite powder ion-exchanged with copper on the second coat layer. Preferably, the catalyst according to the invention and a three-way catalyst are incorporated into the same container so as to arrange the catalyst on an entrance side of the exhaust gas system and the tree-way catalyst on the delivery side thereof and also MFI-type zeolite is used as zeolite powder, whereby the catalyst for the purification of exhaust gas developing a satisfactory purification performance under wider operating conditions from the theoretical air-fuel ratio to the excessive oxygen atmosphere.

What is claimed is:

1. A catalyst for the purification of exhaust gas comprising a first coat layer formed on a honeycomb carrier and consisting essentially of an activated alumina containing cerium, zirconium and lanthanum and palladium as a carrier of the activated alumina, a second coat layer formed on the first coat layer and consisting essentially of an activated alumina containing cerium, zirconium and lanthanum, and a third coat layer formed on the second coat layer and consisting essentially of zeolite powder ion-exchanged with copper.

2. A catalyst according to claim 1, wherein the catalyst is arranged before a three-way catalyst incorporated in the same container.

3. A catalyst according to claim 1, wherein the zeolite powder is a pentasil crystalline aluminosilicate having an MFI structure.

* * * * *